Figure 1:
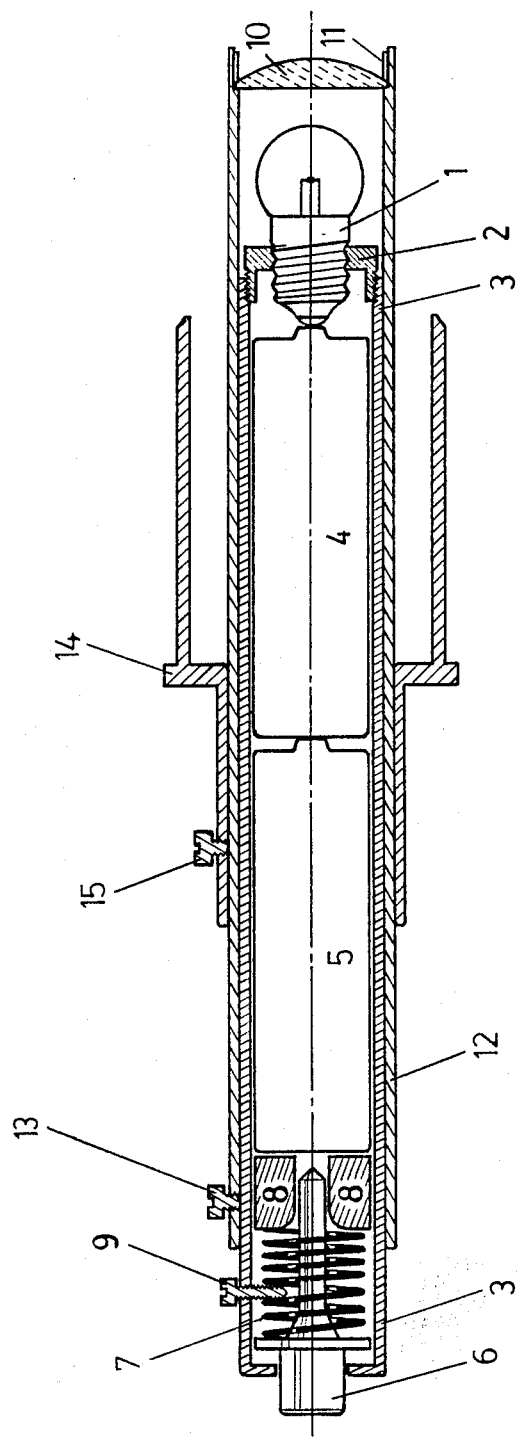

United States Patent [19]

Putland

[11] Patent Number: 4,828,377

[45] Date of Patent: May 9, 1989

[54] TELESCOPE AIMING DEVICE

[76] Inventor: Gavin R. Putland, P.O. Box 125, Mt. Ommaney, 47074, Queensland, Australia

[21] Appl. No.: 147,518

[22] Filed: Jan. 25, 1988

[30] Foreign Application Priority Data

Jul. 31, 1987 [AU] Australia ................................. PI3471

[51] Int. Cl.$^4$ ...................... G02B 23/00; G02B 27/20; F21K 1/00
[52] U.S. Cl. .................................... 350/537; 350/577; 33/277; 362/187; 362/188
[58] Field of Search ....................... 350/577, 537, 545; 356/138, 140, 152; 33/286, 227; 362/187, 188

[56] References Cited

U.S. PATENT DOCUMENTS

| | | | |
|---|---|---|---|
| 1,160,615 | 11/1915 | Jacob | 350/545 |
| 1,346,580 | 7/1920 | Wood | 350/537 |
| 1,517,332 | 12/1924 | Wood | 350/537 |
| 1,526,416 | 2/1925 | Frahz | 350/537 |
| 1,728,993 | 9/1929 | Gerdes | 350/537 |
| 2,707,423 | 5/1955 | Back | 350/537 |
| 3,286,584 | 11/1966 | Hermann | 356/153 |
| 4,438,567 | 3/1984 | Raiha | 33/286 |

FOREIGN PATENT DOCUMENTS 2167578  5/1986  United Kingdom ................ 356/138

Primary Examiner—Jon W. Henry
Attorney, Agent, or Firm—Hoffman, Wasson, Fallow & Gitler

[57] ABSTRACT

A sighting device for aiming an astronomical telescope. The sighting device comprises a tubular housing which is removably mountable in the eyepiece holder of the telescope. A light source is mounted within the tubular housing for projecting light into the eyepiece holder to thereby form a beam of light emergent from the front end of the telescope. This beam of light provides a visual indication of the direction in which the telescope is aimed, and the telescope may be aimed at a desired object or area by reference to the beam of light. After the telescope has been aimed, the sighting device is removed and replaced by a normal eyepiece.

5 Claims, 1 Drawing Sheet

TELESCOPE AIMING DEVICE

This invention relates to the sighting of telescopes. In particular, the invention is directed to a device which enables a telescope to be aimed, quickly and simply, at a desired celestial object, provided that the object is visible to the naked eye or that its position is known relative to nearby objects which are themselves visible to the naked eye.

The difficulty of aiming an astronomical telescope arises from two causes. First, such an instrument tends to have a very narrow field of view. Nearly all astronomical telescopes have a field of view less than three degrees, while a one degree field of view is fairly typical for a "low power" eyepiece. Secondly, when looking through the instrument, the user tends not to look in the actual direction of the object under study; rather, the optical path usually has a right-angle reflection in it so that the user cannot sight along the optical tube with the unused eye. Newtonian telescopes have an inherent right-angle in the light path, while refractors and Cassegrains tend to be used with right-angle prisms ("star diagonals") to make viewing more comfortable.

One known telescope sighting device is the "finderscope" or "viewfinder", which is a small, wide-field refractor with a cross-hair reticle, mounted on the side of the main instrument and aligned parallel with it. The user first locates the object of interest in the finderscope, which is easier than in the main instrument because of the wider field of view, and centres the object in the cross-hairs. The object of interest should then be within the field of the main instrument. However, a finderscope with a "straight-through" optical path is uncomfortable to use because the user has to lower his head and look up, thereby straining the neck. Some finderscopes have star-diagonals to make their use more comfortable, but the right-angle makes it more difficult to bring the desired object initially into the field, firstly because the user cannot sight along the optical tube, and secondly because the image in the finder is mirror-reversed with respect to that seen with the naked eye so that star patterns are more difficult to recognise.

Another known technique is to use an equatorial mounting with setting circles calibrated in right ascension and declination. The user "dials up" or sets the desired coordinates on the setting circles, and the object is hopefully within the low-power field of the main instrument, but certainly within the finderscope field so that the user can more readily use a right-angle finder. The method is quick and direct but has a number of inherent disadvantages. An equatorial mount with setting circles is required, which usually costs of the order of the telescope tube assembly itself, and the mount must be accurately aligned with the celestial pole. Sidereal time must be known so that the user can calibrate the right ascension circle. Furthermore, by using setting circles, no practice at locating objects relative to other objects is gained, hence the user gains no familiarity with the patterns of the night sky. Such familiarity or experience is essential for some amateur astronomical pursuits, such as the search for comets and novae.

It is known that if a point source of light or an image thereof is placed at one of the internal foci of a telescopic gun sight, a pencil beam issues from the objective lens of the telescopic sight and produces a visible bright spot on the target to facilitate aiming the gun in low light. It is also known that if a pencil beam generator is mounted on the side of an astronomical telescope and aligned parallel with the main optical system thereof, the pencil beam can be discerned against the night sky and the apparent "end" of the beam indicates the direction in which the telescope is aimed. These two ideas are combined in the present invention, which places a virtual point source of light at the prime focus of the telescope, so that the main optical system of the telescope projects a parallel beam into the night sky.

In one broad form, the present invention provides a sighting device for use in aiming an astronomical telescope, the sighting device comprising a tubular housing removably mountable in the eyepiece holder of the telescope. The tubular housing has a light source mounted therein for projecting light into the eyepiece holder of the telescope to thereby form a beam of light from the telescope visually indicating the direction in which the telescope is aimed, wherein the tubular housing comprises an intermediate tube having a lens at one end thereof, an inner tube slidably mounted in the intermediate tube, the inner tube having a battery compartment therein for a battery power supply, the light source approximating a point source and being mounted at an end of the inner tube adjacent the lens end of the intermediate tube, means for fixing the inner and intermediate tubes axially relative to each other, and outer tube slidably mounted on the intermediate tube, the outer tube being dimensioned for a sliding fit with the eyepiece holder of the telescope, and means for fixing the outer tube axially relative to the intermediate tube.

One advantage of this arrangement over both the finderscope and the side-mounted pencil beam source is that no adjustment of alignment is needed; the sighting device uses the main optic and is therefore automatically aligned with it. Other advantages over the finderscope include the absence of neck strain or mirror-imaging of star patterns. Other advantages over the side-mounted pencil beam include a wider and more nearly parallel beam with more distinct edges, allowing clearer perception of the varnishing point of the beam. Advantages over setting circles include the absence of any need for an aligned equatorial mount or sidereal time information. Finally, the invention is much less expensive than any of the alternatives.

The preferred embodiment of the invention includes an adjustable preconcentrating lens for matching the light source to the focal ratio of the telescope, and means for mounting the device in the eyepiece holder of the telescope, with provision for parfocalizing the device with the eyepieces used with the telescope.

The light source approximates a point source and may suitably comprise an incandescent filament within an optically clear, spherical globe.

The light source is preferably adjustable relative to the tubular housing to enable the light source to be parfocalised with the eyepiece(s) normally used in the telescope.

In the preferred embodiment, the tubular housing comprises three concentric tubes. The outer tube is dimensioned for a sliding fit with the eyepiece holder of the telescope. The intermediate tube is slidably mounted within the outer tube and has the lens mounted at one end thereof. The inner tube is slidably mounted within the intermediate tube and has the light source mounted at the lens end thereof, and has a manually operable switch at the opposite end. A power supply, such as a battery, may suitably be located within the inner tube.

Thus, in use, the sighting device is inserted in the eyepiece holder of the telescope and the light source is activated to project light into the telescope. The light passes through the optical system of the telescope and emerges as a light beam into the night sky. The telescope can then be aimed at a preselected celestial object by adjusting the orientation of the telescope with visual reference to the beam emerging therefrom.

In order that the invention may be more fully understood and put into effect, a preferred embodiment thereof will now be described with reference to the accompanying drawing which is a sectional elevational view of the sighting device of the preferred embodiment.

The sighting device of the preferred embodiment comprises three concentric sliding tubes 3, 12, 14. The inner tube 3 contains a light source at one end, a switch assembly at the other end and a power source in between. The light source is typically a light bulb 1 which preferably is of the screw-mounted type so that it is accurately centred. It has a small filament and an optically clear, spherical window It should not be onion-dome shaped as this may distort the view of the filament from the lens 10. The bulb 1 is screw fitted into a metal bulb holder 2 which in turn is screw fitted into the electrically conductive inner tube 3.

The power source is typically a battery power supply. In the illustrated embodiment, two size AA "pen-light" batteries 4, 5 are used.

At the other end of the inner tube 3, the switch assembly is of the push-button type which, when depressed, closes the light bulb circuit The light source is only required for short periods, and the push button switch facilitates its turning on and off to enable the sighting beam to be discerned if it is obscured by stray light. The switch assembly comprises a metal plunger or push button 6, a helical compression spring 7, a plastic washer 8 and a metal screw 9. The compressed spring 7 biases the batteries 4, 5 against the base bulb terminal to close that part of the circuit, and pushes the plunger out. The plunger 6 is both the switch actuator and part of the light bulb circuit. Its thick end protrudes through the end of the inner tube 3 and is dimensioned for actuation by the forefinger. A flange on the plunger 6 limits its outward travel by butting against the inside of the end wall of the inner tube. The plunger 6 is shown slightly depressed in the drawing. The thin end of the plunger 6 extends through a central bore in the plastic washer 8 and can be depressed against the negative terminal of the battery 5 to close the light bulb circuit. The plastic washer 8 keeps the plunger centred and prevents the spring 7 from contacting the negative battery terminal and permanently closing the circuit.

A screw 9 is fitted between two turns of the spring 7 to ensure an electrical connection between the spring 7 and the inner tube 3. (This connection would otherwise depend on the loose contact between the plunger 6 and the end of the tube 3). The screw 9 also limits the travel of the middle tube 12 thereby preventing accidental impact of lens 10 against the bulb 1. The spring 7 should be electrically and mechanically connected to the plunger 6 at the left end and mechanically connected to the plastic washer 8 at the right end. The screw 9 then also retains the entire switch assembly in place while the batteries are being replaced. To replace the bulb 1, screw 13 is loosened, the inner tube 3 is pulled out and the bulb 1 is unscrewed and replaced. To replace the batteries, the bulb holder 2 is unscrewed from the inner tube 3 and the batteries can then be removed for replacement.

In the drawing, the bulb 1, plunger 6 and spring 7 are shown pictorially, the batteries are shown in outline only and all other parts are shown in cross section in a plane through the common axis.

Depression of plunger 6 closes the circuit as follows. The base terminal of the bulb 1 contacts the positive terminal of battery 4. The other terminal of the bulb 1 is connected through the bulb holder 2, inner tube 3, screw 9, spring 7 and plunger 6 to the negative terminal of battery 5. The contacts at the switch end are self-maintaining through the movement of the spring and plunger, while the other contacts are accessible for cleaning.

The middle tube 12 carries a lens 10 to pre-concentrate the light from the bulb 1. The middle tube 12 slides telescopically over the inner tube 3 to allow the divergence of light from the lens 10 to be adjusted to match the focal ratio of the telescope. This sliding adjustment can be set by tightening a locking screw 13.

The outer tube 14 is an adaptor piece which allows the device to fit into the telescope eyepiece holder and is therefore dimensioned to emulate an eyepiece barrel. Standard outside diameters of eyepiece barrels are 24.5 mm (0.965 inch), 31.7 mm (1.25 inch) and 50.8 mm (2 inches).

A user will generally buy the sighting device with an outer tube to fit the eyepiece holder of his telescope. However interchangeable outer tubes may be purchased separately to enable the device to be used with more than one eyepiece holder size.

The outer tube 14 slides over the middle tube 12 to allow the light source to be parfocalised with the eyepiece. This sliding adjustment can be set by tightening a locking screw 15. The adjustment of the lens 10 should be made first as it affects the position of the virtual image of the bulb filament formed by the lens and hence affects the parfocalising adjustment.

The lens 10 is held in the middle tube 12 by a lens retaining ring 11. The ring 11 can be screwed in place but is preferably cemented for economy.

The middle tube 12 and outer tube 14 can be made of any suitable material. Preferably they are made of metal in order to have sufficient strength to allow the tightening of screws 13 and 15. The inner tube 3 needs to be of electrically conductive material, e.g. metal, for electrical reasons and should be strong enough to take the load imposed by screw 13.

In use, the user removes the eyepiece from the focusing tube of the telescope and inserts the abovedescribed sighting device. The plunger 6 is then depressed to activate the light source in the sighting device. The telescope then "works backwards", collimating the divergent light from the light source into a parallel beam and projecting it into the sky. Dust particles in the atmosphere reflect some of the light back to the user, allowing the sighting beam to be seen. Because of perspective, the parallel beam appears to converge to a vanishing point on the "celestial sphere". That vanishing point indicates the direction in which the telescope is pointed relative to other naked-eye objects. Having pointed the telescope in the desired direction, the user then removes the sighting device and re-inserts the eyepiece. The inconvenience of removing and replacing eyepieces is minimised if the light source in the sighting device is parfocalised with the eyepieces so that no focus adjustment is required to obtain a focused light beam after removing a focused eyepiece.

In spite of the inverse-square law, it has been found that the beam is actually easier to see at great heights than near the ground. To understand why this is so, suppose at first that the beam is perfectly parallel. Consider the beam as a long cylinder and imagine that it is sliced into a series of uniformly thick discs. Assuming that the discs are uniformly reflective (due to suspended dust particles), the apparent brightness of each disc when viewed from the ground is proportional to the inverse square of its distance. However, the solid angle subtended at the ground by each disc is also proportional to the inverse square of its distance, so that the apparent surface brightness (received intensity per unit solid angle) of each disc is independent of distance. As the number of discs in the line of sight is directly proportional to the distance along the beam, the apparent surface brightness of the beam, when viewed from the ground, increases with distance, i.e. it increases as one approaches the vanishing point. In practice, the beam is not quite parallel, so that instead of seeing a star-like point of light at the vanishing point with a "tail" of diminishing intensity trailing back into the telescope tube, one sees a slightly blurred image of that pattern. Experiments have shown that the sighting beam looks similar to a comet, the centre of the comet's "head" marking the centre of the telescope's field.

The lens 10 should be positioned so that the diverging cone of light from the lens does not quite fit within the clear aperture of the telescope. If the lens 10 is too close to the bulb 1 so that the cone is too divergent less light falls on the main mirror or lens of the telescope to be focused into the sighting beam. Against this, moving the lens 10 closer to the bulb 1 also decreases the size of the virtual image of the filament formed by the lens 10 and therefore makes the beam more nearly parallel and the head of the apparent "comet" sharper. The apparent surface brightness of the comet's "head" remains constant, but the "head" becomes smaller and the "tail" fainter, rendering the whole beam harder to see. If the lens 10 is too far away from the bulb 1, the lens 10 gathers less of the bulb's light (so the beam is fainter) and concentrates it towards the centre of the telescope's aperture; the aperture is not illuminated evenly to its outer edge, so that the beam is narrower and its edge is indistinct, making it harder to judge where the vanishing point is. Moreover, moving the lens away from the bulb increases the size of the virtual image of the filament, so that the beam becomes less parallel and its comet-like appearance more blurred.

Under exceptionally clear skies, the beam is fainter because there is less reflective dust in the air, but the background sky is darker for the same reason, so that beam contrast is preserved.

From the foregoing discussion, it will be apparent to those skilled in the art that there is significant advantage in using the main optical system of the telescope to focus the beam instead of an auxiliary system. To avoid being prohibitively expensive, an auxiliary system would need to have an aperture much smaller than the main optic. If it had a proportionally shorter focal length, the virtual image of the filament would subtend a greater angle at that focal length for the optimal lens setting, and hence the beam would be less nearly parallel. If the focal length were increased without increasing the aperture, it would be necessary to pre-concentrate the light more to maintain overall beam brightness, magnifying the virtual image of the filament more, and thereby negating any gain in "comet head" sharpness which might have resulted from the longer focal length. Thus it can be seen that a bright, highly parallel beam requires a large aperture. It is therefore advantageous to use the main optical system of the telescope.

Another advantage of using the main optic is that the sighting or aiming system then requires no adjustment, provided of course that the light source is well centred in the eyepiece holder. A separate optical system would require periodic realignment, as does a conventional finder.

The invention is most easily used for aiming a telescope at an object visible to the naked eye. However, an object which is not visible to the naked eye may be located by reference to nearby visible stars; this exercise is of great value in acquainting oneself with the patterns of the sky.

The foregoing describes only one embodiment of the invention, and modifications which are obvious to those skilled in the art may be made thereto without departing from the scope of the invention as defined in the following claims.

I claim:

1. A sighting device for use in aiming an astronomical telescope, said sighting device comprising a tubular housing removably mountable in the eyepiece holder of a telescope, said tubular housing having a light source mounted therein for projecting light into said eyepiece holder of said telescope to thereby form a beam of light from said telescope visually indicating the direction in which said telescope is aimed, wherein said tubular housing comprises an intermediate tube having a lens at one end thereof, an inner tube slidably mounted in said intermediate tube, said inner tube having a battery compartment therein for a battery power supply, said light source approximating a point source and being mounted at an end of said inner tube adjacent the lens end of said intermediate tube, means for fixing said inner and intermediate tubes axially relative to each other, and outer tube slidably mounted on said intermediate tube, said outer tube being dimensioned for a sliding fit with the eyepiece holder of the telescope, and means for fixing said outer tube axially relative to said intermediate tube.

2. A sighting device as claimed in claim 1, wherein said light source comprises an incandescent lamp.

3. A sighting device as claimed in claim 2 further comprising a manually operable switch for connecting said battery power supply to said incandescent lamp, said switch being located at the opposite axial end of said inner tube from said lamp.

4. A sighting device as claimed in claim 3, wherein said switch comprises a resiliently biased plunger protruding axially from said opposite end of the inner tube, said switch being closed upon depression of said plunger.

5. A sighting device for aiming an astronomical telescope by placement of a point source of light or an image thereof at the prime focus of said telescope so as to produce a parallel beam of light indicating the direction of pointing of said telescope, said device comprising:

(a) an inner tube containing a battery compartment and switch assembly for powering a point source of light mounted at one end of said inner tube and on the axis thereof, said switch assembly being located at the other end of said inner tube, (b) an intermediate tube slidably mounted on the inner tube and having a converging lens mounted at one end of said intermediate tube and coaxial with it, said lens being adjacent to the light source end of said inner tube, (c) an outer tube slidably mounted on the intermediate tube and being dimensioned for a sliding fit within an eyepiece holder of the telescope whereby all three tubes are coaxial with said eyepiece holder, and (d) locking screws for fixing the inner tube axially relative to the intermediate tube and the intermediate tube axially relative to the outer tube.

* * * * *